(12) United States Patent
Dai et al.

(10) Patent No.: US 10,521,105 B2
(45) Date of Patent: *Dec. 31, 2019

(54) DETECTING PRIMARY HOVER POINT FOR MULTI-HOVER POINT DEVICE

(71) Applicant: Microsoft Technology Licensing, LLC, Redmond, WA (US)

(72) Inventors: Lynn Dai, Sammamish, WA (US); Dan Hwang, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/008,023

(22) Filed: Jun. 14, 2018

(65) Prior Publication Data

US 2019/0138178 A1   May 9, 2019

Related U.S. Application Data

(63) Continuation of application No. 14/027,341, filed on Sep. 16, 2013, now Pat. No. 10,025,489.

(51) Int. Cl.
*G06F 3/0488* (2013.01)
(52) U.S. Cl.
CPC ........ *G06F 3/0488* (2013.01); *G06F 3/04883* (2013.01); *G06F 2203/04808* (2013.01)
(58) Field of Classification Search
CPC ......... G06F 2203/04808; G06F 3/0488; G06F 3/04883
See application file for complete search history.

(56) References Cited

U.S. PATENT DOCUMENTS

| 10,025,489 B2 * | 7/2018 | Dai ...................... G06F 3/0488 |
| 2005/0226505 A1 * | 10/2005 | Wilson .................. G06F 3/0425 382/180 |

(Continued)

FOREIGN PATENT DOCUMENTS

| CN | 102402384 A | 4/2012 |
| CN | 102749990 A | 10/2012 |

OTHER PUBLICATIONS

"Office Action Issued in Chinese Patent Application No. 201480051000.2", dated Apr. 28, 2018, 18 Pages.

(Continued)

*Primary Examiner* — Afroza Chowdhury

(57) ABSTRACT

Example apparatus and methods concern establishing, managing, or dis-establishing a primary hover-point for a hover-sensitive input/output interface. One example apparatus includes a proximity detector that detects an object in a hover-space associated with the input/output interface. The apparatus produces characterization data concerning the object. The characterization data may identify where the object is located, how the object is moving, what the object is doing, or other attributes of the object. The apparatus may assign a hover point designation to the object as a function of the characterization data. The apparatus selectively controls input actions associated with the object based on the hover point designation. The apparatus may accept input actions associated with a primary hover point and ignore actions associated with a non-primary hover point.

20 Claims, 9 Drawing Sheets

(56) References Cited

U.S. PATENT DOCUMENTS

| | | | | |
|---|---|---|---|---|
| 2008/0012835 A1* | 1/2008 | Rimon | ................... | G06F 3/038 |
| | | | | 345/173 |
| 2012/0233545 A1* | 9/2012 | Ikeda | ................... | G06F 3/0488 |
| | | | | 715/702 |
| 2015/0052430 A1* | 2/2015 | Dwan | .................. | G06F 3/0482 |
| | | | | 715/702 |
| 2015/0077338 A1* | 3/2015 | Dai | ....................... | G06F 3/0488 |
| | | | | 345/157 |

OTHER PUBLICATIONS

"Second Office Action Issued in Chinese Patent Application No. 201480051000.2", dated Dec. 25, 2018, 6 Pages.

"International Preliminary Report on Patentability Issued in PCT Patent Application No. PCT/US2014/055287", dated Dec. 15, 2015, 9 Pages.

* cited by examiner

DETECTING PRIMARY HOVER POINT FOR MULTI-HOVER POINT DEVICE

CROSS REFERENCE TO RELATED APPLICATIONS

This application is a continuation of and claims priority to U.S. application Ser. No. 14/027,341, entitled "DETECTING PRIMARY HOVER POINT FOR MULTI-HOVER POINT DEVICE," filed Sep. 16, 2013, which is incorporated herein in its entirety.

BACKGROUND

Touch sensitive screens have, in some apparatus, been replaced by hover-sensitive screens that rely on proximity detectors. While touch sensitive screens detected objects that touched the screen, hover-sensitive screens may detect objects that are within a certain distance of the screen. A touch sensitive screen may have identified the points on the screen that were being touched by the user, user stylus, or other object. Actions could be controlled based on the touch points and the actions that occurred at the touch points.

Conventional hover-sensitive screens detect objects in a hover-space associated with the hover-sensitive device. When there is a single object in the hover-space, conventional systems have had no difficulty associating a primary hover-point to the single object. However, when there are multiple objects in the hover-space, or as objects enter, move around in, and leave the hover-space, it may have been difficult, if even possible at all, to establish, maintain, and re-assign a primary hover-point designation to the multiple moving objects. Reacting appropriately to user actions depends, at least in part, on correctly identifying the primary hover-point and then establishing, maintaining, and managing that primary hover-point designation.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example methods and apparatus are directed towards identifying a primary hover point for a hover-sensitive screen. Example methods and apparatus may detect a set of objects in a hover-space associated with a hover-sensitive input/output (i/o) interface and then associate a primary hover point designation with a subset of the set of objects. In one embodiment, a single primary hover-point may be established while in another embodiment, a plurality of primary hover-points may be established. Example methods and apparatus may then associate a non-primary hover point designation with objects that are not designated as being associated with a primary hover point. Actions performed by an i/o interface in response to user actions may then be determined, at least in part, by whether the action was performed by an object associated with a primary hover point or by an object associated with a non-primary hover point.

Some embodiments may include a hover-sensitive i/o interface and a proximity detector that detects objects (e.g., finger, thumb, stylus) in a three dimensional volume (e.g., hover-space) associated with an apparatus. The hover-space may be disposed in proximity to the i/o interface and in an area accessible to the proximity detector. An embodiment may produce characterization data concerning the object. An embodiment may selectively control the action performed on the i/o interface as a function of the characterization data and as a function of whether the characterization data is associated with an object associated with a primary hover point or with a non-primary hover point.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example apparatus and methods detect objects in a hover-space associated with an i/o interface. Example apparatus and methods then determine which, if any, of the objects will be identified as being associated with a primary hover point. Once an object(s) associated with a primary hover point(s) is identified, i/o performed by the i/o interface will be controlled, at least in part, by the relationship established between the object and the primary hover point. In one embodiment, a relationship between a single object and a single primary hover point may be established. In this embodiment, inputs may only be received from the single object. In another embodiment, two or more objects may be identified as being associated with two or more primary hover points. In this embodiment, inputs may be received from the two or more objects either individually or in combination. Example apparatus and methods may also manage (e.g., change) and dis-establish (e.g., remove) associations between objects and hover points. In one embodiment, once an object is associated with a primary hover point that object will remain associated with the primary hover point until that object leaves the hover-space. In another embodiment, which object(s) is associated with a primary hover point(s) may change over time based on actions taken by the object or by other objects. For example, another object may come closer to the i/o interface, another object may be more active in the hover-space, another object may make more identifiable gestures in the hover-space, another object may be positioned over a calibration point, or other action.

Hover technology is used to detect an object in a hover-space. "Hover technology" and "hover sensitive" refer to sensing an object spaced away from (e.g., not touching) yet in close proximity to a display in an electronic device. "Close proximity" may mean, for example, beyond 1 mm but within 1 cm, beyond 0.1 mm but within 10 cm, or other combinations of ranges. Being in close proximity includes being within a range where a proximity detector can detect and characterize an object in the hover-space. The device may be, for example, a phone, a tablet computer, a computer, or other device. Hover technology may depend on a proximity detector(s) associated with the device that is hover sensitive. Example apparatus may include the proximity detector(s).

Figure 1:
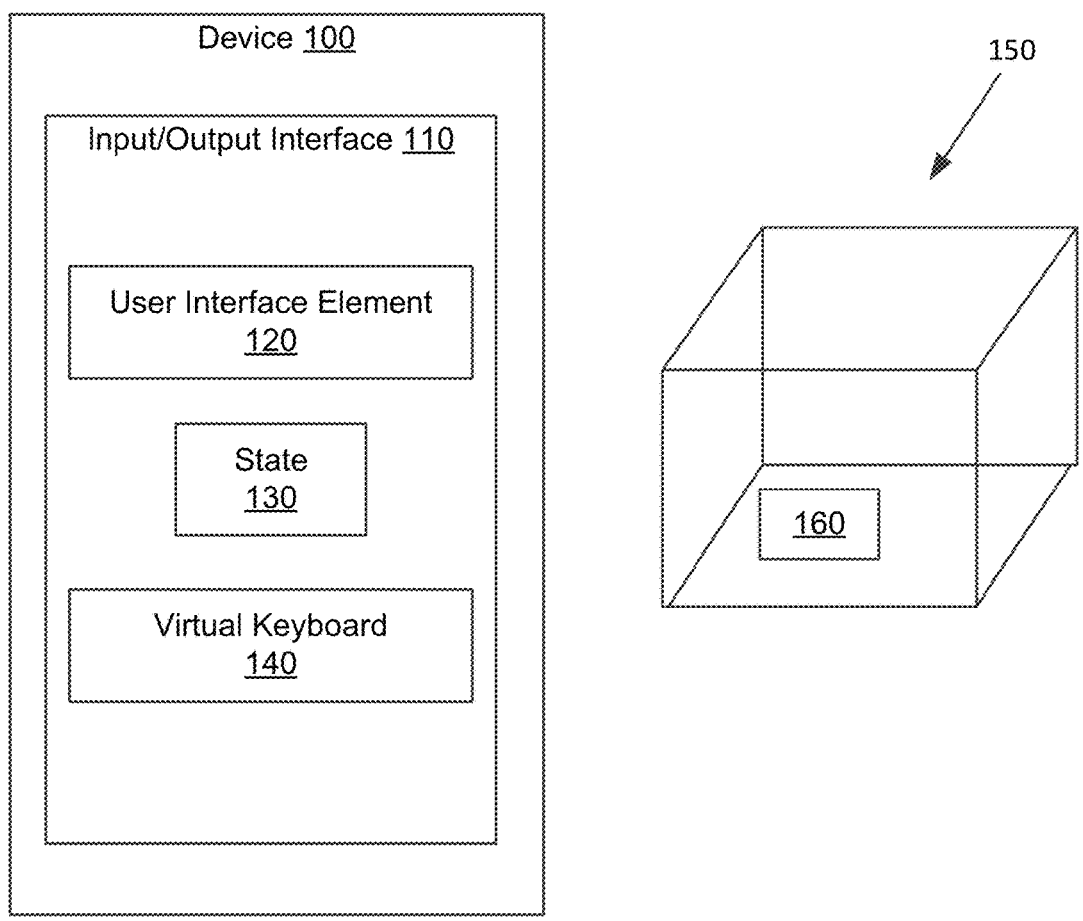
FIG. 1 illustrates an example hover-sensitive device.

FIG. 1 illustrates an example hover-sensitive device 100. Device 100 includes an input/output (i/o) interface 110. I/O interface 100 is hover sensitive. I/O interface 100 may display a set of items including, for example, a virtual keyboard 140 and, more generically, a user interface element 120. User interface elements may be used to display information and to receive user interactions. The user interactions may be performed in the hover-space 150 without touching the device 100. Device 100 or i/o interface 110 may store state 130 about the user interface element 120, the virtual keyboard 140, or other items that are displayed. The state 130 of the user interface element 120 may depend on an action performed using virtual keyboard 140. The state 130 may include, for example, the location of an object designated as being associated with a primary hover point, the location of an object designated as being associated with a non-primary hover point, or other information. Which user interactions are performed may depend, at least in part, on which object in the hover-space is considered to be the primary hover-point. For example, an object associated with the primary hover point may make a gesture. At the same time, an object associated with a non-primary hover point may also appear to make a gesture. Conventionally, it may have been difficult, if even possible at all, to decide which i/o operation to perform when presented with simultaneous gestures. Example apparatus and methods may decide on which i/o operation to perform based, at least in part, on the primary/non-primary designations.

The device 100 may include a proximity detector that detects when an object (e.g., digit, pencil, stylus with capacitive tip) is close to but not touching the i/o interface 110. The proximity detector may identify the location (x, y, z) of an object 160 in the three-dimensional hover-space 150. The proximity detector may also identify other attributes of the object 160 including, for example, the speed with which the object 160 is moving in the hover-space 150, the orientation (e.g., pitch, roll, yaw) of the object 160 with respect to the hover-space 150, the direction in which the object 160 is moving with respect to the hover-space 150 or device 100, a gesture being made by the object 160, or other attributes of the object 160. While a single object 160 is illustrated, the proximity detector may detect more than one object in the hover-space 150.

In one embodiment, when there is more than one object in the hover-space 150, example apparatus and methods may designate one of the objects as being associated with a primary hover-point and may relegate the other objects to being associated with secondary or non-primary hover-points. In another embodiment, when there is more than one object in the hover-space, example apparatus and methods may designate a subset of the objects as being associated with primary hover-points and may designate the objects that are not in the subset as being associated with secondary or non-primary hover-points. Example apparatus and methods may then decide what input action to take based, at least in part, on the primary/non-primary designations. Additionally, example apparatus and methods may decide what output action to take based, at least in part, on the primary/non-primary designations.

In different examples, the proximity detector may use active or passive systems. For example, the proximity detector may use sensing technologies including, but not limited to, capacitive, electric field, inductive, Hall effect, Reed effect, Eddy current, magneto resistive, optical shadow, optical visual light, optical infrared (IR), optical color recognition, ultrasonic, acoustic emission, radar, heat, sonar, conductive, and resistive technologies. Active systems may include, among other systems, infrared or ultrasonic systems. Passive systems may include, among other systems, capacitive or optical shadow systems. In one embodiment, when the proximity detector uses capacitive technology, the detector may include a set of capacitive sensing nodes to detect a capacitance change in the hover-space 150. The capacitance change may be caused, for example, by a digit(s) (e.g., finger, thumb) or other object(s) (e.g., pen, capacitive stylus) that comes within the detection range of the capacitive sensing nodes. In another embodiment, when the proximity detector uses infrared light, the proximity detector may transmit infrared light and detect reflections of that light from an object within the detection range (e.g., in the hover-space 150) of the infrared sensors. Similarly, when the proximity detector uses ultrasonic sound, the proximity detector may transmit a sound into the hover-space 150 and then measure the echoes of the sounds. In another embodiment, when the proximity detector uses a photodetector, the proximity detector may track changes in light intensity. Increases in intensity may reveal the removal of an object from the hover-space 150 while decreases in intensity may reveal the entry of an object into the hover-space 150.

In general, a proximity detector includes a set of proximity sensors that generate a set of sensing fields in the hover-space 150 associated with the i/o interface 110. The proximity detector generates a signal when an object is detected in the hover-space 150. In one embodiment, a single sensing field may be employed. In other embodiments, two or more sensing fields may be employed. In one embodiment, a single technology may be used to detect or characterize the object 160 in the hover-space 150. In another embodiment, a combination of two or more technologies may be used to detect or characterize the object 160 in the hover-space 150.

In one embodiment, characterizing the object includes receiving a signal from a detection system (e.g., proximity detector) provided by the device. The detection system may be an active detection system (e.g., infrared, ultrasonic), a passive detection system (e.g., capacitive), or a combination of systems. The detection system may be incorporated into the device or provided by the device.

Characterizing the object may also include other actions. For example, characterizing the object may include determining that an object (e.g., digit, stylus) has entered the hover-space or has left the hover-space. Characterizing the object may also include identifying the presence of an object at a pre-determined location in the hover-space. The pre-determined location may be relative to the i/o interface or may be relative to the position of a particular user interface element. In one embodiment, the user may control which object will be associated with the primary hover point by placing the object over a pre-determined "define primary hover point here" user interface element or by making an "I am the object to associate with the primary hover point" gesture.

Figure 2:
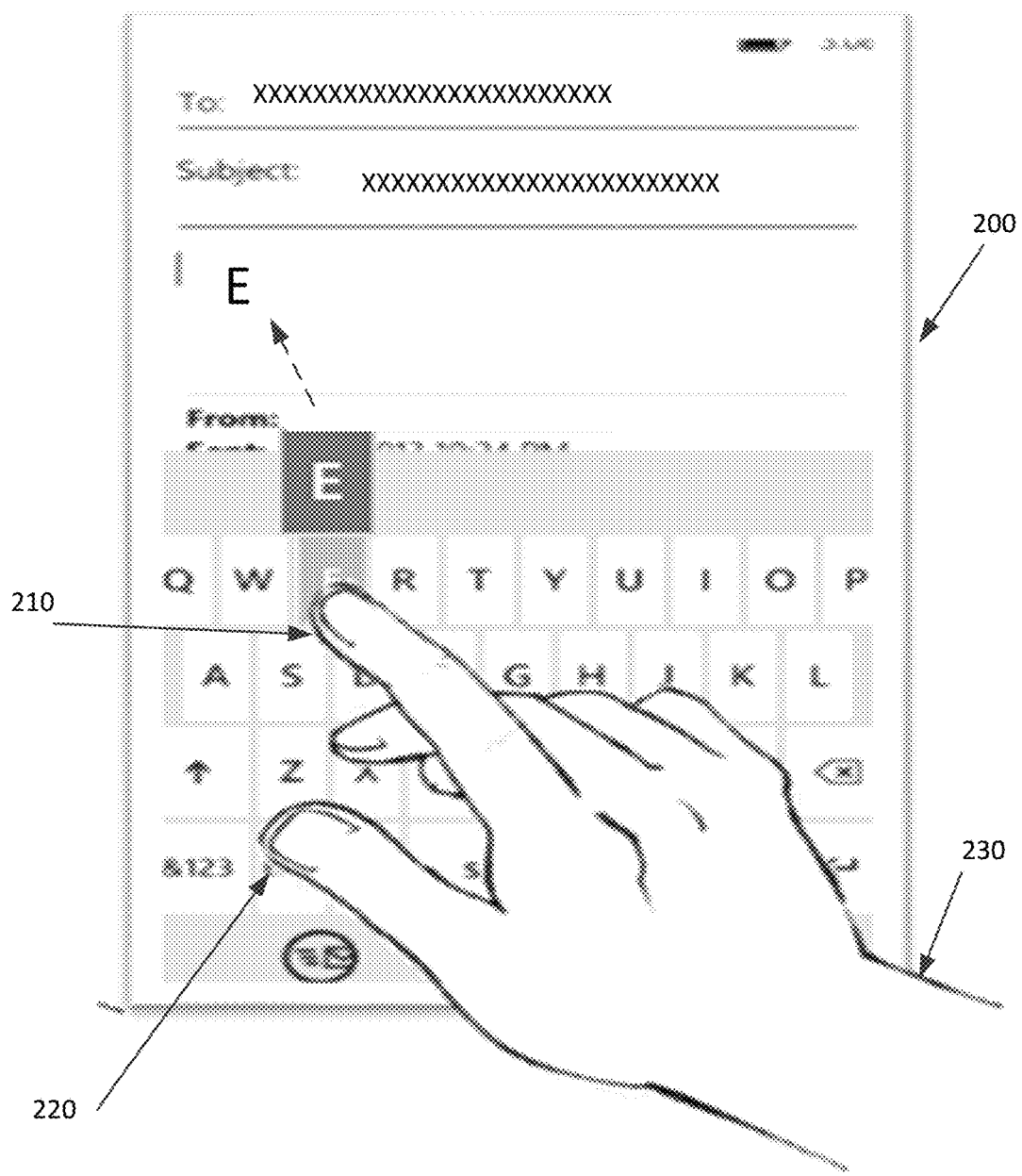
FIG. 2 illustrates an example hover-sensitive device.

FIG. 2 illustrates a simulated hover-sensitive device 200. The index finger 210 of a user has been designated as being associated with a primary hover point. Therefore, actions taken by the index finger 210 cause i/o activity on the hover-sensitive device 200. For example, hovering finger 210 over a certain key on a virtual keyboard may cause that key to become highlighted. Then, making a simulated typing action (e.g., virtual key press) over the highlighted key may cause an input action that causes a certain keystroke to appear in a text input box. For example, the letter E may be placed in a text input box. Unfortunately, conventional systems may have difficulty when thumb 220 or wrist 230 are also present in the hover-space. For example, if thumb 220 was closer to the i/o interface or was the first item to enter the hover-space, then thumb 220 might inadvertently be associated with the primary hover point instead of finger 210. Similarly, if wrist 230 was closer to the i/o interface or was the first item to enter the hover-space, then wrist 230 may be associated with the primary hover point instead of finger 210. Example apparatus and methods facilitate identifying an appropriate object to associate with a primary hover point. Example apparatus and methods also facilitate managing the relationship between an object and a primary hover point. Conventionally, finger 210 may initially have been designated as being associated with the primary hover point but the appearance or action of thumb 220 may have caused inadvertent and undesired toggling of the primary hover point.

Figure 3:
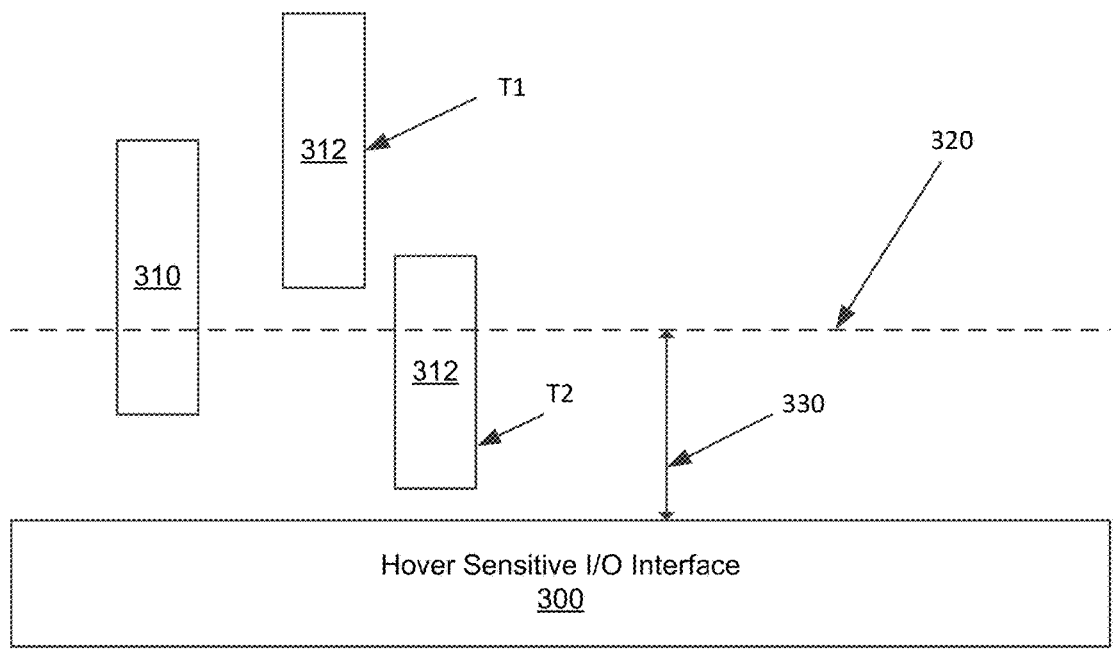
FIG. 3 illustrates a portion of an example hover-sensitive device.

FIG. 3 illustrates a hover sensitive i/o interface 300. Line 320 represents the outer limit of the hover-space associated with hover sensitive i/o interface 300. Line 320 is positioned at a distance 330 from i/o interface 300. Distance 330 and thus line 320 may have different dimensions and positions for different apparatus depending, for example, on the proximity detection technology used by a device that supports i/o interface 300.

Example apparatus and methods may identify objects located in the hover-space bounded by i/o interface 300 and line 320. Ata first time T1, an object 310 may be detectable in the hover-space and an object 312 may not be detectable in the hover-space. At a second time T2, object 312 may enter the hover-space and may actually come closer to the i/o interface 300 than object 310. Example apparatus and methods facilitate establishing a relationship between an object and a primary hover point designation or between an object and a non-primary hover point designation. In one embodiment, since object 310 was the first object to enter the hover-space, object 310 may be related to the primary hover point and object 312 may be relegated to a non-primary hover point. In another embodiment, since object 312 comes closer to i/o interface 300, object 310 may lose the relationship with the primary hover point and object 312 may acquire the relationship. But in another embodiment, just because object 312 comes closer to i/o interface 300 may not allow object 312 to supplant the relationship between object 310 and the primary hover point.

Different users may have different desires concerning how the first-in versus closest relationship should be handled. Thus, in one embodiment, example apparatus and methods may provide an application programming interface (API) through which a user, program, process, or other actor may configure or reconfigure i/o interface 300. Thus, one user may opt for the first-in approach while another user may opt for the closest approach. In one embodiment, the configuration may be performed using logic in the device supporting i/o interface 300 while in another embodiment the configuration may be performed off the device.

Figure 4:
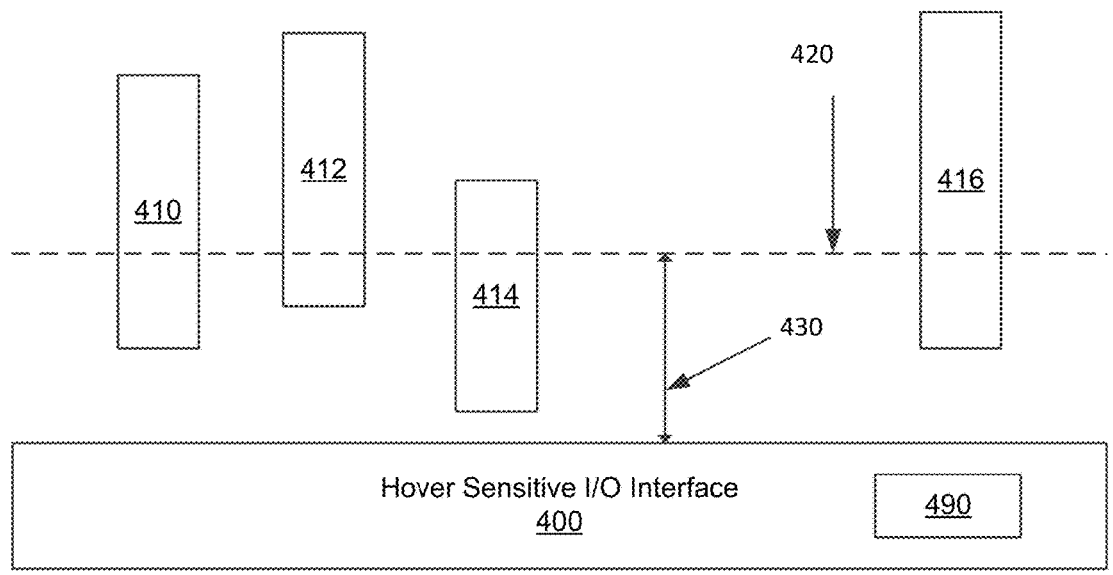
FIG. 4 illustrates a portion of an example hover-sensitive device.

FIG. 4 illustrates a hover sensitive i/o interface 400. Line 420 depicts the limits of a hover-space associated with i/o interface 400. Line 420 is positioned at a distance 430 from the i/o interface 400. The hover-space may be present between the i/o interface 400 and line 420. While a straight line is illustrated, the hover-space may vary in size and shape. There are four objects in the hover-space. Object 410 may have been the first object to enter the hover-space. Object 414 may be the closest to the i/o interface 400. Object 416 may be positioned over a calibration point 490. Object 412 may have been in the hover-space for the longest period of time, may also have been the most active object in the hover-space, or may have made an identifiable gesture in the hover-space. Object 412 may also have an identifiable characteristic (e.g., fingerprint, radio frequency identification (RFID) tag, bar code, quick response (QR) code). Example apparatus and methods facilitate flexibly defining how an apparatus should identify which object or objects are to be associated with a primary hover point and which object or objects are to be associated with a non-primary hover point. Once objects have been related to either primary hover points or non-primary hover points, then inputs can be determined based, at least in part, on the relations. Similarly, the outputs presented by the i/o interface 400 may be controlled, at least in part, by the relations. Since different users may have different preferences, i/o interface 400 may be configurable with respect to how an object is to be identified as being associated with a primary hover point and how an object is to be identified as being associated with a non-primary hover point.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 5:
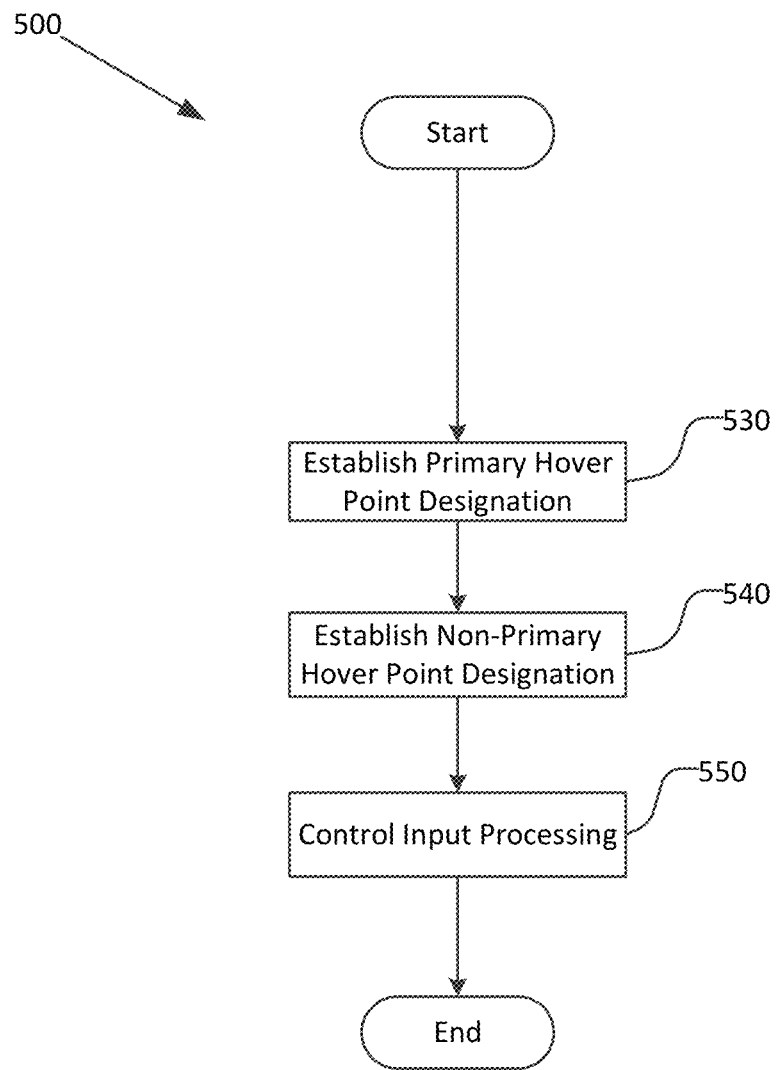
FIG. 5 illustrates an example method associated with primary hover point processing.

FIG. 5 illustrates an example method 500 associated with primary hover point processing. Method 500 includes, at 530, establishing a primary hover point designation. In one embodiment, a single primary hover point may be designated for a single member of a set of objects. Members of the set of objects will be at least partially present in a hover-space associated with an input/output interface associated with an apparatus. For example, a fingertip may be in a hover-space while the part of the finger nearest the hand may not be in the hover space. Similarly, the tip of a stylus may be located in the hover space while the other end of the stylus is not. Establishing the designation may include, for example, updating a value in a computer memory, sending a message to an apparatus, generating an interrupt that is handled by a processor, storing a value in a register, storing a value in a data store, or other action.

Method 500 may also include, at 540, establishing a non-primary hover point designation for a second, different member of the set of objects. The non-primary hover point designation may be, for example, a secondary designation, a to-be-ignored designation, or other designation.

In one embodiment, method 500 may establish primary hover point designations at 530 for a first subset of members of the set of objects. In this embodiment, method 500 may also establish non-primary hover point designations at 540 for a second, different subset of member of the set of objects. The first subset and the second subset may be disjoint.

The primary hover point may be established at 530 in different ways. In one embodiment, establishing the primary hover point designation is a function of which member of the set of objects entered the hover-space first. In another embodiment, establishing the primary hover point designation is a function of which member of the set of objects has spent the longest amount of time in the hover-space. In other embodiments, establishing the primary hover point designation is a function of which member of the set of objects is closest to the input/output interface or is a function of which member of the set of objects is positioned within a threshold distance of a calibration point associated with the input/output interface. In one embodiment, establishing the primary hover point designation is a function of which member of the set of objects makes a pre-determined gesture. The gesture may be used to identify the object making the gesture as being intended to be associated with the primary hover point. Consider that one digit may be more mobile, agile, precise or diverse than other digits. Consider also that a stylus may be operated with more mobility, agility, precision or diversity than some digits. Therefore, performing a precise or complicated gesture may be required to earn a primary hover point designation. In this way, a certain digit or stylus may be able to perform the gesture while the base of the thumb or the wrist may not be able to perform the gesture. In one embodiment, establishing the primary hover point designation is a function of which member of the set of objects exhibits an identifying characteristic. For example, a finger may exhibit a pre-determined fingerprint, a stylus may present an RFID tag, a pencil may display a bar code, or an optical pencil may present a QR code. A user may habitually interact with a device using a certain digit or implement (e.g., stylus). Thus, method 500 may establish the primary hover point designation at 530 in response to detecting the object that has most habitually been associated with the primary hover point.

In one embodiment, non-primary hover point designations may be established at 540 using similar approaches to those used to establish primary hover point designations at 530. In one embodiment, primary or non-primary designations may be established as a function of one or more of the actions or attributes described in connection with action 530.

Method 500 may also include, at 550, selectively controlling how the input/output interface processes actions performed by members of the set of objects. The control may be exercised based, at least in part, on the primary hover point designation and the non-primary hover point designation. In one embodiment, selectively controlling at 550 how the input/output interface processes actions includes accepting inputs from the first member and rejecting inputs from the second member. In another embodiment, selectively controlling at 550 how the input/output interface processes actions comprises accepting inputs from the first member before accepting inputs from the second member. In one embodiment, how the input/output interface processes actions may be user configurable.

Figure 6:
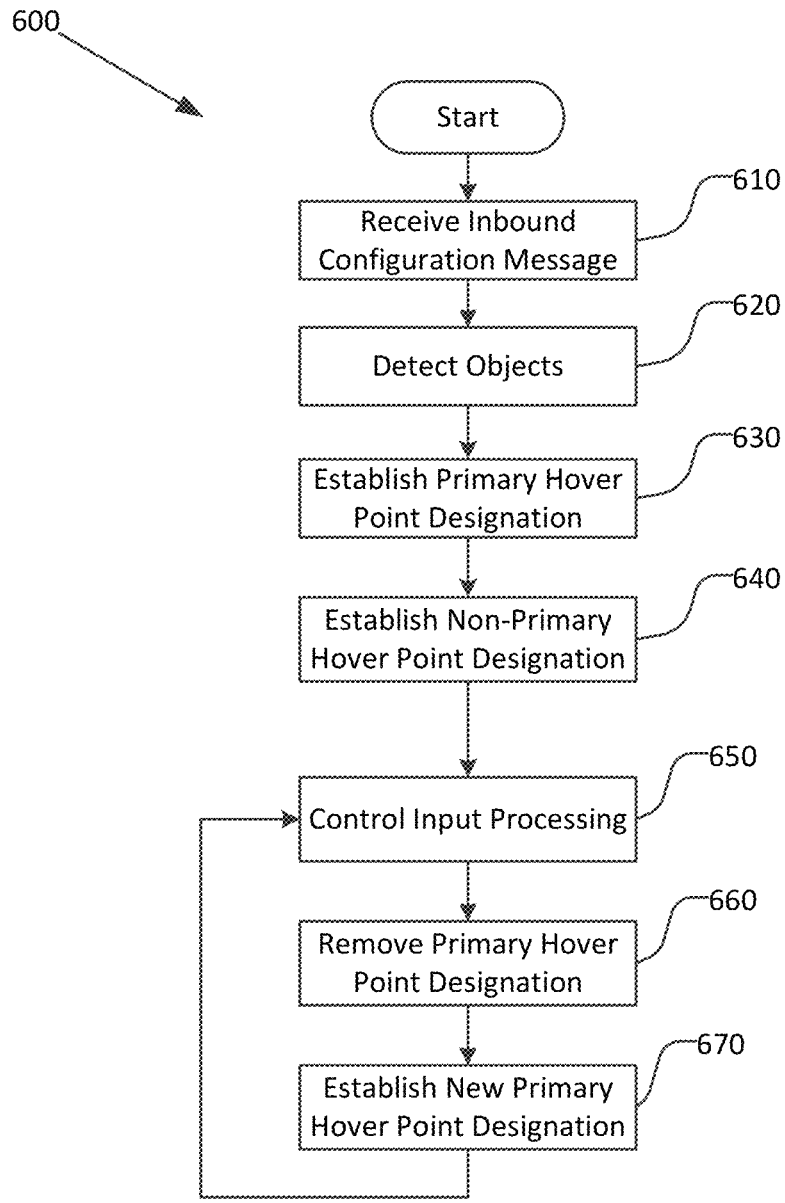
FIG. 6 illustrates an example method associated with a primary hover point processing.

FIG. 6 illustrates an example method 600 that is similar to method 500 (FIG. 5). For example, method 600 includes establishing a primary hover point designation(s) at 630, establishing a non-primary designation(s) at 640, and controlling input processing at 640. However, method 600 also includes additional actions.

Method 600 also includes, at 620, detecting the set of objects in the hover-space. The objects may be detected in response to receiving a signal from a detection system provided by the apparatus for which hover point processing is being performed. The detection system may be, for example, an active detection system or a passive detection system. Detecting the objects and characterizing the objects may be an ongoing process.

Conventionally, the appearance, operation, and other attributes of user interface elements may have been configurable through on-screen configuration. However, user interface elements or gestures used to define an object as being associated with the primary hover point may not have been configurable. The configuration that was possible, if any, may have occurred through user interaction with the element and not through programmatic control. Example apparatus and methods provide a more configurable and extensible approach to configuration. To support this configurability, method 600 may include, at 610, receiving an inbound message. The message may be received, for example, through an application programming interface (API) provided by a process running on the device. In different embodiments the inbound message may also be received using other message passing approaches including, for example, sockets, remote procedure calls, interrupts, or shared memory. The inbound message may include configuration information that controls how an apparatus will determine which object or objects to associate with a primary hover point or points and which object or objects to associate with a non-primary hover point or points.

Method 600 may, as a function of receiving the inbound message, selectively reconfigure how a primary hover point designation is established at 630 or selectively reconfigure how a non-primary hover point designation is established at 640.

A user may interact with a hover-sensitive screen in different ways at different times. For example, at a first time a user may be using a texting application, at a second time a user may be editing a photograph, and at a third time a user may be handling their email. Different applications may have different types of interfaces with which a user may interact in different ways. A user may interact with their text application with their index finger, may interact with their email application with their thumbs, and may interact with the photography application with a stylus. Therefore method 600 also includes, at 660, removing the primary hover point designation for the first member and, at 670, establishing the primary hover point designation for a different member of the set of objects. While changing designations may be desired for different applications, the changing may occur as the result of a user action. For example, removing the primary hover point designation may be a function of the first member leaving the hover-space or the first member making a second pre-determined gesture. While the first pre-determined gesture may have indicated that an object wanted to receive the primary hover point designation, the second pre-determined gesture may indicate that the object wants to relinquish the primary hover point designation. Establishing the primary hover point designation for the different member may be a function of the different member entering the hover-space, the different member being closer to the input/output interface than any other member of the set of objects, the different member making the first pre-determined gesture, or the different member being positioned within a threshold distance of the calibration point.

While FIGS. 5 and 6 illustrate various actions occurring in serial, it is to be appreciated that various actions illustrated in FIGS. 5 and 6 could occur substantially in parallel. By way of illustration, a first process could identify objects, a second process could manage object to primary hover point relationships, and a third process could manage object to non-primary hover point relationships. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 500 or 600. While executable instructions associated with the listed methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

Figure 7:
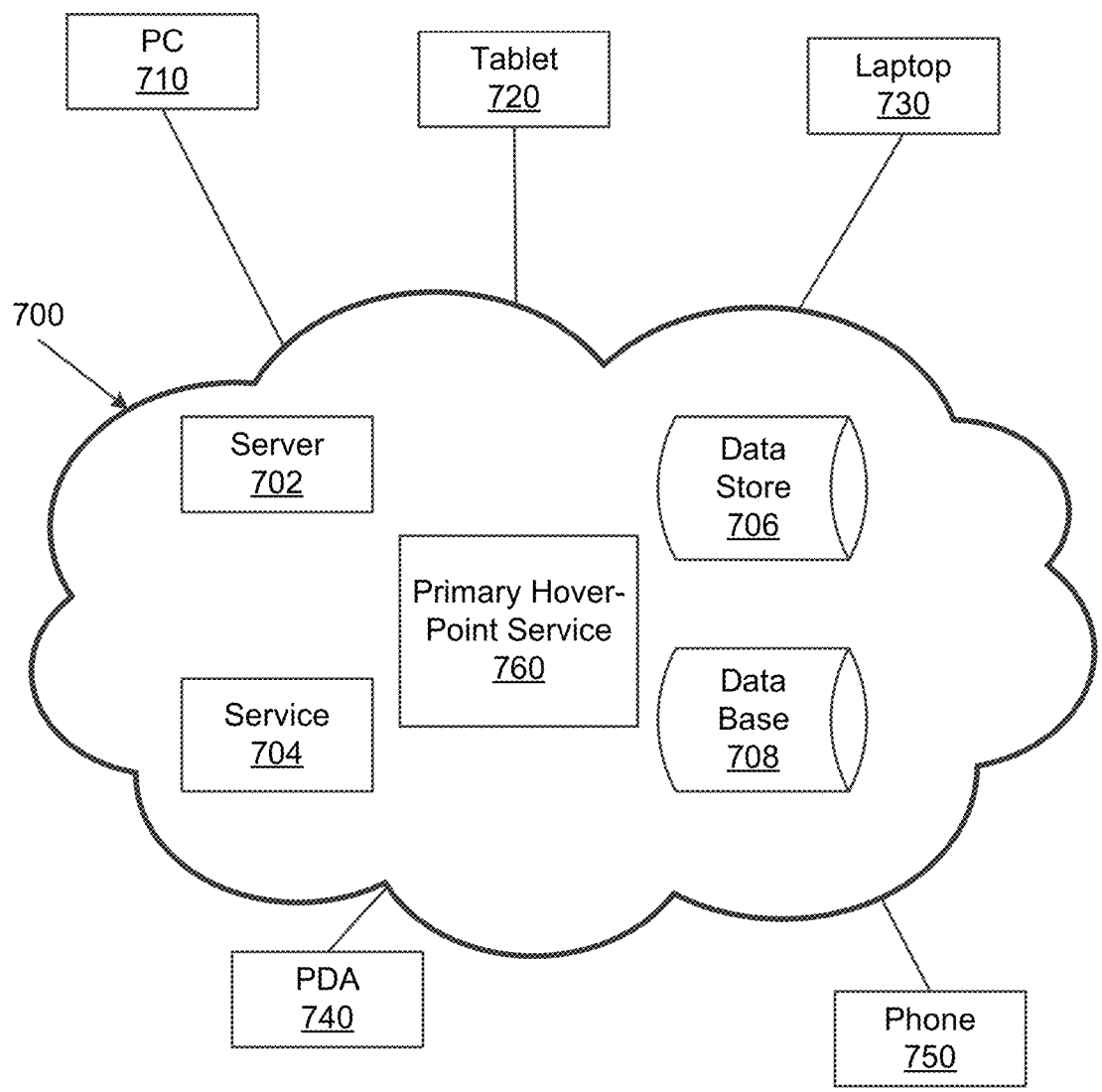
FIG. 7 illustrates an example cloud operating environment in which primary hover point control may be supported.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example primary hover-point service 760 residing in the cloud. The primary hover-point service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the primary hover point service 760.

FIG. 7 illustrates various devices accessing the primary hover-point service 760 in the cloud. The devices include a computer 710, a tablet 720, a laptop computer 730, a personal digital assistant 740, and a mobile device (e.g., cellular phone, satellite phone) 750. It is possible that different users at different locations using different devices may access the primary hover-point service 760 through different networks or interfaces. In one example, the primary hover-point service 760 may be accessed by a mobile device 750. In another example, portions of primary hover-point service 760 may reside on a mobile device 750. Primary hover-point service 760 may perform actions including, for example, configuring primary hover point identification for a device, performing primary hover point detection for a device, managing primary hover point designations for a device, or other action. In one embodiment, primary hover-point service 760 may perform portions of methods described herein (e.g., method 500, method 600).

Figure 8:
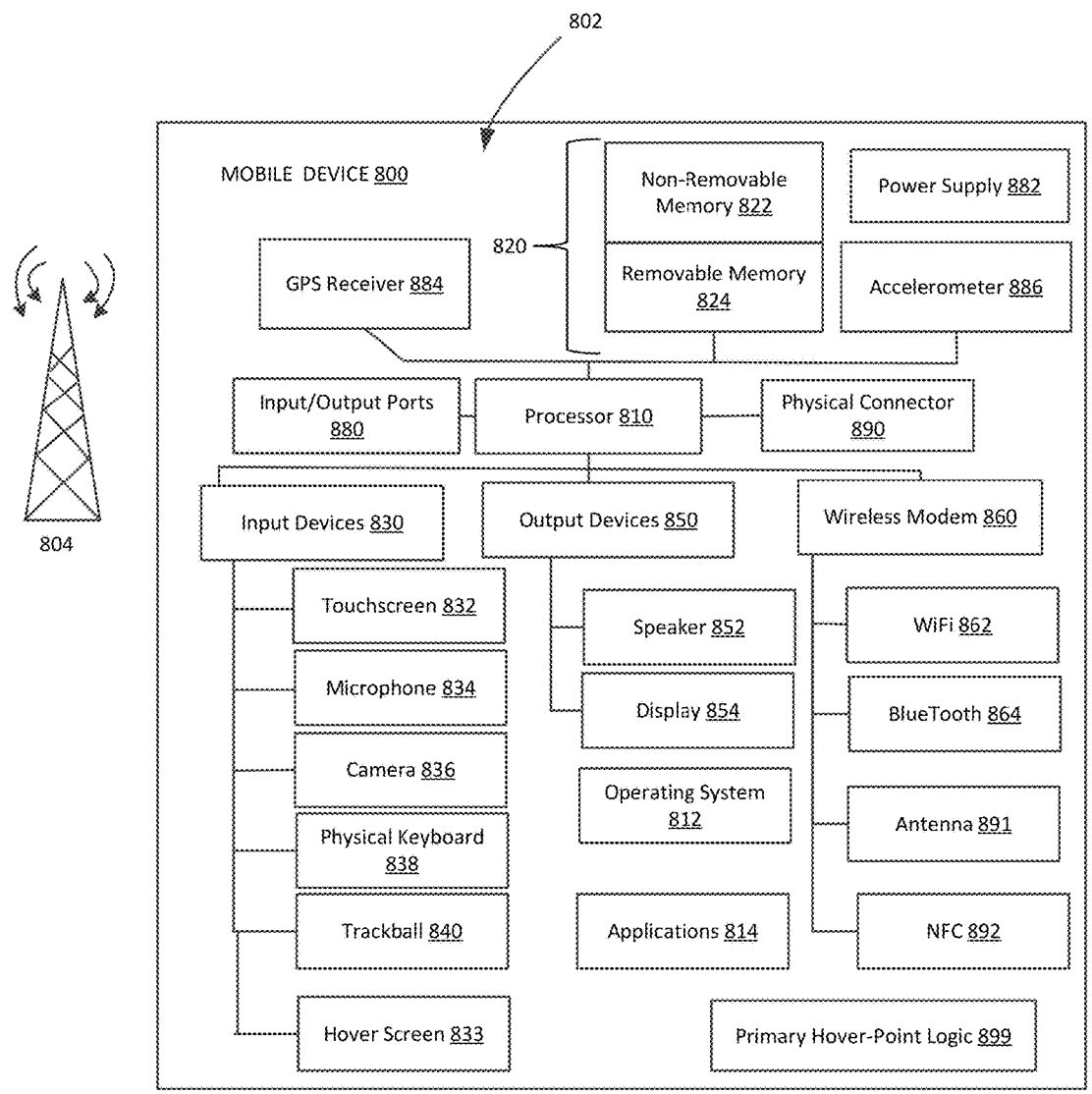
FIG. 8 is a system diagram depicting an exemplary mobile communication device configured to support primary hover point processing.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), etc.) and may allow wireless two-way communications with one or more mobile communications networks 804, such as a cellular or satellite networks.

Mobile device 800 can include a controller or processor 810 (e.g., signal processor, microprocessor, application specific integrated circuit (ASIC), or other control and processing logic circuitry) for performing tasks including signal coding, data processing, input/output processing, power control, or other functions. An operating system 812 can control the allocation and usage of the components 802 and support application programs 814. The application programs 814 can include mobile computing applications (e.g., email applications, calendars, contact managers, web browsers, messaging applications), or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is known in GSM communication systems, or other memory storage technologies, such as "smart cards." The memory 820 can be used for storing data or code for running the operating system 812 and the applications 814. Example data can include object to primary hover point relationship data, object to non-primary hover point relationship data, hover point establishment configuration data, user interface element state, web pages, text, images, sound files, video data, or other data sets to be sent to or received from one or more network servers or other devices via one or more wired or wireless networks. The memory 820 can store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a hover screen 833, a microphone 834, a camera 836, a physical keyboard 838, or trackball 840. While a touch screen 832 and a physical keyboard 838 are described, in one embodiment a screen may be hover-sensitive and may display a virtual keyboard. The mobile device 800 may also support output devices 850 including, but not limited to, a speaker 852 and a display 854. Other possible input devices (not shown) include accelerometers (e.g., one dimensional, two dimensional, three dimensional). Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (electro-encephalogram (EEG) and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to an application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). Mobile device 800 may also communicate locally using, for example, near field communication (NFC) element 892.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a primary hover-point logic 899 that is configured to provide a functionality for the mobile device 800. For example, primary hover-point logic 899 may provide a client for interacting with a service (e.g., service 760, FIG. 7). Portions of the example methods described herein may be performed by primary hover-point logic 899. Similarly, primary hover-point logic 899 may implement portions of apparatus described herein.

Figure 9:
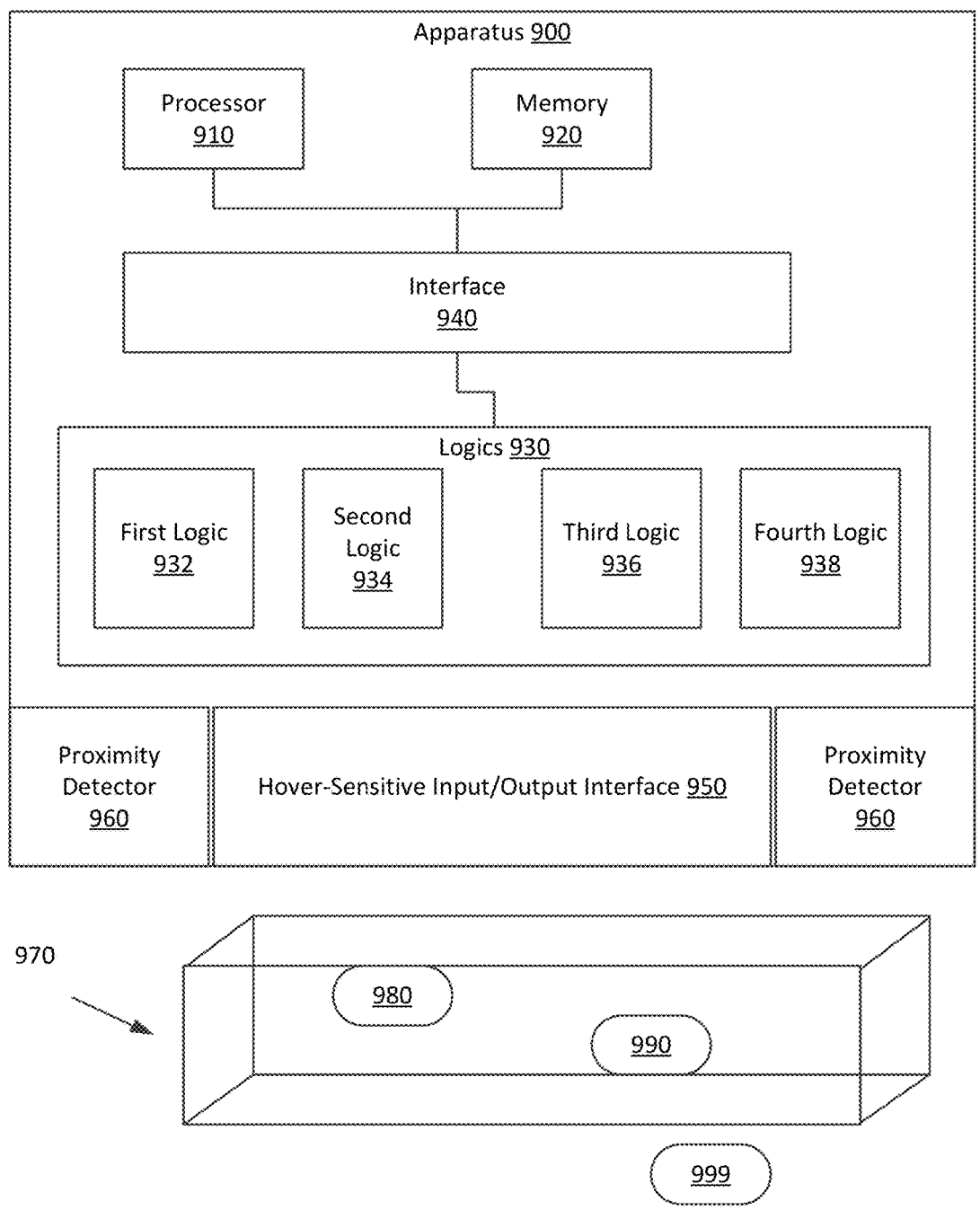
FIG. 9 illustrates an example apparatus that performs primary hover point processing.

FIG. 9 illustrates an apparatus 900 that supports primary hover point processing. In one example, the apparatus 900 includes an interface 940 configured to connect a processor 910, a memory 920, a set of logics 930, a proximity detector 960, and a hover sensitive i/o interface 950. Elements of the apparatus 900 may be configured to communicate with each other, but not all connections have been shown for clarity of illustration.

The proximity detector 960 may detect an object 980 in a hover-space 970 associated with the apparatus 900. The proximity detector 960 may also detect another object 990 in the hover-space 970. The hover-space 970 may be, for example, a three dimensional volume disposed in proximity to the i/o interface 950 and in an area accessible to the proximity detector 960. The hover-space 970 has finite bounds. Therefore the proximity detector 960 may not detect an object 999 that is positioned outside the hover-space 970. A user may place a digit in the hover-space 970, may place multiple digits in the hover-space 970, may place their hand in the hover-space 970, may place an object (e.g., stylus) in the hover-space, may make a gesture in the hover-space 970, may remove a digit from the hover-space 970, or take other actions. Apparatus 900 analyzes data associated with the objects in the hover-space 970, determines which object should be associated with a primary hover-space, and controls operation of the i/o interface 950 based, at least in part, on the relationship between an object and the primary hover point.

Apparatus 900 may include a first logic 932 that is configured to produce characterization data concerning the object or objects that are present in the hover-space 970. In one embodiment, the characterization data may describe when the object 980 entered the hover-space 970. Knowing when an object entered the hover-space 970 supports a first-in or longest-in approach to associating an object with a primary hover point. The characterization data may also describe where the object 980 entered the hover-space 970 or where the object 980 is located in the hover-space 970. Knowing where an object entered the hover-space 970 or where the object is located in the hover-space supports a closest to the i/o interface approach or an "over the calibration point" approach to identifying a primary hover point. The characterization data may also describe a direction of travel of the object 980, a velocity of travel of the object 980 or a gesture performed by the object 980. Knowing how an object is moving supports identifying a gesture based or movement based approach to identifying a primary hover point. The characterization data may also describe an orientation of the object 980 or a size of the object 980. Knowing the size or orientation of an object supports an approach for identifying the primary hover point that considers the size of an object (e.g., finger versus thumb) and whether the object is facing the i/o interface 950. The characterization data may also describe an activity level of the object 980, an identifying mark on or associated with the object 980, or other attribute. The characterization data may also describe the object 990 or other objects in the hover-space 970. The characterization data may depend on signals provided by the proximity detector 960 to the first logic 932. Apparatus 900 may then either or both of object 980 or 990 as being associated with a primary hover point. Apparatus 900 may designate objects that are not associated with a primary hover point as being associated with a non-primary hover point. The designations may be based, at least in part, on the characterization data.

Apparatus 900 may include a second logic 934 that is configured to establish and maintain a relationship between the object 980 and a primary hover point for the input/output interface 950. Establishing the relationship may include, for example, updating a value in memory 920, sending a message to another apparatus, generating an interrupt that is handled by processor 910, storing a value in a register, storing a value in a data store, or other action. In one embodiment the relationship may be stored as state data for the i/o interface 950. The relationship may be based, at least in part, on the characterization data. The relationship controls how the input/output interface 950 will interpret actions performed in the hover-space 970 by the object 980. For example, the relationship may control whether an action performed by object 980 will be processed or ignored or whether an action performed by object 990 will be processed or ignored.

In one embodiment, the hover point designation may be established for an object that is the only object in the hover-space 970. In another embodiment, the hover point designation may be established for an object that was the first of a plurality of objects in the hover-space 970 to enter the hover-space 970. In another embodiment, the hover point designation may be established for an object that has been in the hover-space longer than any other objects in the hover-space. In another embodiment, the hover point designation may be established for an object that is the closest object to the input/output interface in the hover-space 970. In another embodiment, the hover point designation may be established for an object that has made a pre-determined gesture in the hover space 970. For example, apparatus 900 may be configured to recognize an "I am the primary object" gesture. An object that performs the "I am the primary object" gesture may receive the primary hover point designation. In another embodiment, the hover point designation may be established for an object that is positioned within a threshold distance of a calibration point. For example, apparatus 900 may control i/o interface 950 to display a bulls-eye or other symbol over which a user can place the object that the user intends to be associated with the primary hover point. In yet another embodiment, the hover point designation may be established for an object that presents a pre-determined identifier. For example, a user may habitually type with a certain finger or thumb. The finger or thumb may have a unique fingerprint. When an object presenting the pre-determined fingerprint is in the hover-space 970, that object may receive the primary hover point designation. Similarly, a user may habitually use a certain stylus with a capacitive tip. The stylus may be adorned with a QR code or may include an RFID tag. When an object presenting the pre-determined QR code or RFID tag is present, that object may receive the primary hover point designation.

Apparatus 900 may include a third logic 936 that is configured to control how the input/output interface 950 handles input actions from the object 980 as a function of the relationship. In one embodiment, the third logic 936 is configured to control the input/output interface 950 to selectively accept actions from the object as inputs when the relationship identifies the object as being associated with the primary hover point. The third logic 936 may also be configured to control the input/output interface 950 to selectively ignore actions from the object when the relationship identifies the object as not being associated with the primary hover point. The object designations may have been established by the second logic 934 processing the characterization data produced by the first logic 932.

Apparatus 900 may also include a fourth logic 938 that is configured to reconfigure how the second logic 934 establishes the relationship. In one embodiment, the fourth logic 938 reconfigures the second logic 934 in response to a message received from a user or an application through a messaging interface. The message may describe, for example, how the user would like to have an object be identified as being associated with a primary hover point or how a user would like to have an object be identified as being associated with a non-primary hover point. In one embodiment, a non-primary hover point may be a secondary hover point or a hover point that is to be ignored. By way of illustration, a user may provide configuration information to fourth logic 938. The information may identify that only a first finger having a first fingerprint, a second finger having a second fingerprint, or a stylus having a unique stylus property (e.g., RFID tag, QR code) are to be associated with a primary hover point. The user may also provide configuration information for deciding between the three possible choices when two or more of the three choices are present in the hover-space.

Apparatus 900 may include a memory 920. Memory 920 can include non-removable memory or removable memory. Non-removable memory may include random access memory (RAM), read only memory (ROM), flash memory, a hard disk, or other memory storage technologies. Removable memory may include flash memory, or other memory storage technologies, such as "smart cards." Memory 920 may be configured to store user interface state information, characterization data, object data, or other data.

Apparatus 900 may include a processor 910. Processor 910 may be, for example, a signal processor, a microprocessor, an application specific integrated circuit (ASIC), or other control and processing logic circuitry for performing tasks including signal coding, data processing, input/output processing, power control, or other functions. Processor 910 may be configured to interact with logics 930 that establish and manage primary hover-point associations and non-primary (e.g., secondary, ignored) hover-point associations.

In one embodiment, the apparatus 900 may be a general purpose computer that has been transformed into a special purpose computer through the inclusion of the set of logics 930. The set of logics 930 may be configured to perform input and output. Apparatus 900 may interact with other apparatus, processes, and services through, for example, a computer network.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
identifying a first member in a hover-space, the first member comprising a first characteristic;
establishing a primary hover point designation for the first member based on the first characteristic, where the first member is at least partially present in a hover-space associated with an input/output interface associated with an apparatus;
identifying a second member in the hover-space, the second member comprising a second characteristic;
establishing a non-primary hover point designation for the second member based on the second characteristic; and
selectively controlling how the input/output interface processes actions performed by the primary hover point designation and not the non-primary hover point designation.

2. The method of claim 1, where establishing the primary hover point designation is a function of which member of the set of objects entered the hover-space first.

3. The method of claim 1, where establishing the primary hover point designation is a function of which member of the set of objects has spent the longest amount of time in the hover-space.

4. The method of claim 1, where establishing the primary hover point designation is a function of which member of the set of objects is closest to the input/output interface.

5. The method of claim 1, where establishing the primary hover point designation is a function of which member of the set of objects is positioned within a threshold distance of a calibration point associated with the input/output interface.

6. The method of claim 1, where establishing the primary hover point designation is a function of which member of the set of objects makes a pre-determined gesture.

7. The method of claim 1, where establishing the primary hover point designation is a function of which member of the set of objects exhibits an identifying characteristic.

8. The method of claim 1, where selectively controlling how the input/output interface processes actions comprises controlling the input/output interface to accept inputs from the first member and to reject inputs from the second member.

9. The method of claim 1, where selectively controlling how the input/output interface processes actions comprises controlling the input/output interface to accept inputs from the first member before accepting inputs from the second member.

10. The method of claim 1, comprising:
establishing primary hover point designations for a first subset of members of the set of objects, and
establishing non-primary hover point designations for a second, different subset of member of the set of objects, the first subset and the second subset being disjoint.

11. The method of claim 1, comprising:
removing the primary hover point designation for the first member, and
establishing the primary hover point designation for a different member of the set of objects.

12. The method of claim 11,
where removing the primary hover point designation is a function of the first member leaving the hover-space or the first member making a second pre-determined gesture, and
where establishing the primary hover point designation for the different member is a function of the different member entering the hover-space, the different member being closer to the input/output interface than any other member of the set of objects, the different member making the pre-determined gesture, or the different member being positioned within a threshold distance of the calibration point.

13. The method of claim 1, comprising detecting the set of objects in the hover-space in response to receiving a signal from an active detection system provided by the apparatus, or in response to receiving a signal from a passive detection system provided by the apparatus.

14. The method of claim 1, comprising:
receiving an inbound message through an application programming interface (API) provided by a process running on the apparatus, and
as a function of the inbound message:
selectively reconfiguring how a primary hover point designation is established, or
selectively reconfiguring how a non-primary hover point designation is established.

15. A computer-readable storage medium storing computer-executable instructions that when executed by a computer cause the computer to perform a method, the method comprising:
identifying a first member in a hover-space, the first member comprising a first characteristic;
detecting a set of objects in a hover-space in response to receiving a signal from a proximity detection system associated with a hover sensitive input/output interface associated with an apparatus;
establishing a primary hover point designation for the first member based on the first characteristic, where the first member is at least partially present in the hover-space, and where establishing the primary hover point designation is a function of which member of the set of objects entered the hover-space first;
identifying a second member in the hover-space, the second member comprising a second characteristic;
establishing a non-primary hover point designation for the second member based on the second characteristic;
selectively controlling how the input/output interface processes actions performed by the primary hover point designation and not the non-primary hover point designation;
receiving an inbound message through an application programming interface (API) provided by a process running on the apparatus, and
as a function of the inbound message:
selectively reconfiguring how a primary hover point designation is established.

16. An apparatus, comprising:
a hover-sensitive input/output interface;
a proximity detector configured to:
identifying a first member in a hover-space, the first member comprising a first characteristic; and
detect an object in a hover-space associated with the hover-sensitive input/output interface;
establish a primary hover point designation for the first member of based on the first characteristic, where the first member is at least partially present in a hover-space associated with an input/output interface associated with an apparatus;
identify a second member in the hover-space, the second member comprising a second characteristic;
a first logic configured to produce characterization data concerning the object, where the characterization data describes when the object entered the hover-space, where the object entered the hover-space, where the object is located in the hover-space, a direction of travel of the object, a velocity of travel of the object, a gesture performed by the object, an orientation of the object, a size of the object, an amount of time the object has been located in the hover-space, an activity level of the object, or an identifying mark associated with the object; and
a second logic configured to:
establish a non-primary hover point designation for the second member based on the second characteristic; and
selectively control how the input/output interface processes actions performed by the primary hover point designation and not the non-primary hover point designation.

17. The apparatus of claim 16, where establishing the hover point designation is a function of identifying:
whether the object is the only object in the hover-space,
whether the object was the first of a plurality of objects in the hover-space to enter the hover-space,
whether the object has been in the hover-space longer than any other objects in the hover-space,
whether the object is the closest object to the input/output interface in the hover-space,
whether the object has made a pre-determined gesture,
whether the object is positioned within a threshold distance of a calibration point, or
whether the object has a pre-determined identifier.

18. The apparatus of claim 17, comprising a third logic configured to control how the input/output interface handles input actions from the object as a function of the relationship.

19. The apparatus of claim 18, where the third logic is configured:
to control the input/output interface to selectively accept input actions from the object when the relationship identifies the object as being associated with the primary hover point, and
to control the input/output interface to selectively ignore input actions from the object when the relationship identifies the object as not being associated with the primary hover point.

20. The apparatus of claim 19, comprising a fourth logic that reconfigures how the second logic establishes the relationship, where the fourth logic reconfigures the second logic in response to a message received from a user or an application through a messaging interface.

* * * * *